Nov. 23, 1965    H. BIEHL    3,218,954
DEVICE FOR WORKING-UP FODDER CAPABLE OF BEING ENSILAGED
Filed Oct. 24, 1962    2 Sheets-Sheet 2

INVENTOR.
Heinrich Biehl
BY
Beaman & Beaman
attys

United States Patent Office 3,218,954
Patented Nov. 23, 1965

3,218,954
DEVICE FOR WORKING-UP FODDER CAPABLE
OF BEING ENSILAGED
Heinrich Biehl, Heinrichshof, near Trittau, Germany
Filed Oct. 24, 1962, Ser. No. 232,818
Claims priority, application Germany, Nov. 4, 1961,
B 64,677
1 Claim. (Cl. 99—235)

The invention relates to a device for preparing fodder capable of being ensilaged, and to the production of fermented fodder from mixtures of various types of fresh fodder as well as dry substances and chemical additives.

Methods for the pretreatment of green fodder capable of being ensilaged have become known in which the green fodder to be fermented is crushed and comminuted. In this operation, the device for carrying out the process is arranged so that when crushing, a considerable portion of the cells is opened whereby a great portion of the juice of the plants is freed. In order to reduce the water content of the fodder to the range of 72 to 76%, dry nourishing substances such as potato fibers, dry chips of sugar beets or dried grass are added. Furthermore, processes are known employing devices for the production of fermented fodder in which stewed potatos or non-comminuted beets that have had only a short vapour treatment are mixed with fresh beet leaves and worked into a pulpy mass and then fermented.

Applicant has developed a process in which fresh fodder and a dry mixture of starch-containing and albumen-containing substances are united to form a mixture capable of being fermented.

All known devices for the preparation of fermented fodder have proved to be technically insufficient if a composition of the mixed fodder is required that may be varied in wide limits. Research in this field of composing nourishing substances to make inexpensive mixed fodders has revealed many requirements concerning the composition and the properties of the fodder to be fermented. Reduced to a short formula, these conditions are as follows:

(1) Reducing the water content to about 50 to 75% as opposed to 78 to 90% in fresh substances rich in juice;

(2) a minimum sugar content of 1 to 3% in the ensilaged substance;

(3) an albumen starch ratio as far as possible in correspondence with that of grain;

(4) a composition of the fresh fodder and the additives such that on fermentation the formation of lactic acid is strongly favoured in comparison with the formation of acetic acid and butyric acid.

To meet these requirements it is necessary that for the various operational conditions various mixtures of fresh fodder are used, the composition of which as to their proportions, being further dependent on the quality of the individual components. A simple and suitable method of preparation of the fodder, as well as a device for working the fodder to be fermented which is adapted to meet such requirements, are the prerequisites necessary for the economical exploitation of this new knowledge gained by scientists.

It is therefore an object of the invention to provide a device to work mixed fodder.

In accordance with the invention, a process is proposed in which the individual components of the fodder are automatically discharged from a supply vehicle onto a conveyor and from there into a comminuting device. The comminuted fresh fodder is pumped from the comminuting device into the storage containers provided for the individual components. From these storage containers the respective amounts of the individual components are weighed in correspondence with the desired composition of the nourishing substance and introduced together into a mixing device. This comminuted and homogeneously mixed fresh fodder, and the dry substances which may be mixed therewith, if desired, or required, as well as chemical additives, are then fed into the silo through a pump in a supply line. In accordance with the invention the silo is arranged so that the fermented fodder may be pumped off through a discharge opening in the bottom, and may be passed on with the aid of another pump via a system of pressurized lines directly into sties or stables or to other feeding places. Provisions are also made for the fodder being in the process of fermentation to be re-pumped within the silo in that the fodder drawn off below is re-pumped into the silo at its top. This re-pumping process has an especially favourable influence on the quality of the fodder because it guarantees an absolutely uniform fermentation of the total content of the silo.

For carrying out this process, the following device is proposed in accordance with the invention:

An automatic discharging device fitted on the supply vehicles supplies the components of the fresh fodder to be worked to a conveyor belt or worm conveyor (lift conveyor) which supplies the fresh fodder to a comminuting device. The comminuting device may, for instance, be a kind of hammer mill having motor driving means. The comminuted fodder which forms a fluid pulp is then conveyed by means of a pump to storage container inlet distributing means having several individual outlet branches each connected with an inlet of a separate storage container via means capable of shutting off the supply of said pulp to its respective storage container. Each storage container has a lower outlet from which the material contained in the container may be discharged at will into an inlet of a mixing machine. Generally, each of said inlets of said mixing machine is arranged below one of said storage container outlets, and between said storage container outlet and said mixing machine inlet a proportioning device such as a weighing scale and/or a valve may be arranged. The storage containers, the mixing machine, and the equipment arranged therebetween together form a mixing device which allows for intimate mixing of selected amounts of the materials contained in said storage containers. In the mixing machine, the amounts of fresh fodder taken from the individual storage containers and the dry substances and chemical additives which are weighed and added from further containers are homogeneously mixed. The viscous fresh pulp of mixed fodder which is thus formed, is then drawn from the mixing chamber of the mixing machine and pumped into a supply line, the free end of which is arranged above the inlet opening of the silo. For withdrawing the fermented mixed fodder or for re-pumping the mixed fodder still being in the process of fermentation, a discharge opening to provided at the bottom of the silo through which the fodder may be pumped off. At the exit of said pump, a branch line is situated which selectively makes possible the re-pumping of the fodder from the discharge opening at the bottom to the inlet opening at the top of the silo, and the supply of the ready fodder to the sheds via a pressurized line. In this connection, the withdrawal of fodder from a discharge opening at the bottom of the silo in accord with the invention is distinguished over the known methods in that in accordance with the invention the fodder is drawn off and passed onward with the aid of a pump.

The new process as well as the new device for carrying out the same will now be described, illustrating by way of example an embodiment of the invention showing the most essential features thereof. The device for carrying out the process in accordance with the embodiment illustrated by way of example is shown in FIGS. 1–3. In the drawings, FIG. 1 is a schematic view of the device for working fodder capable of being ensilaged;

Figure 1:
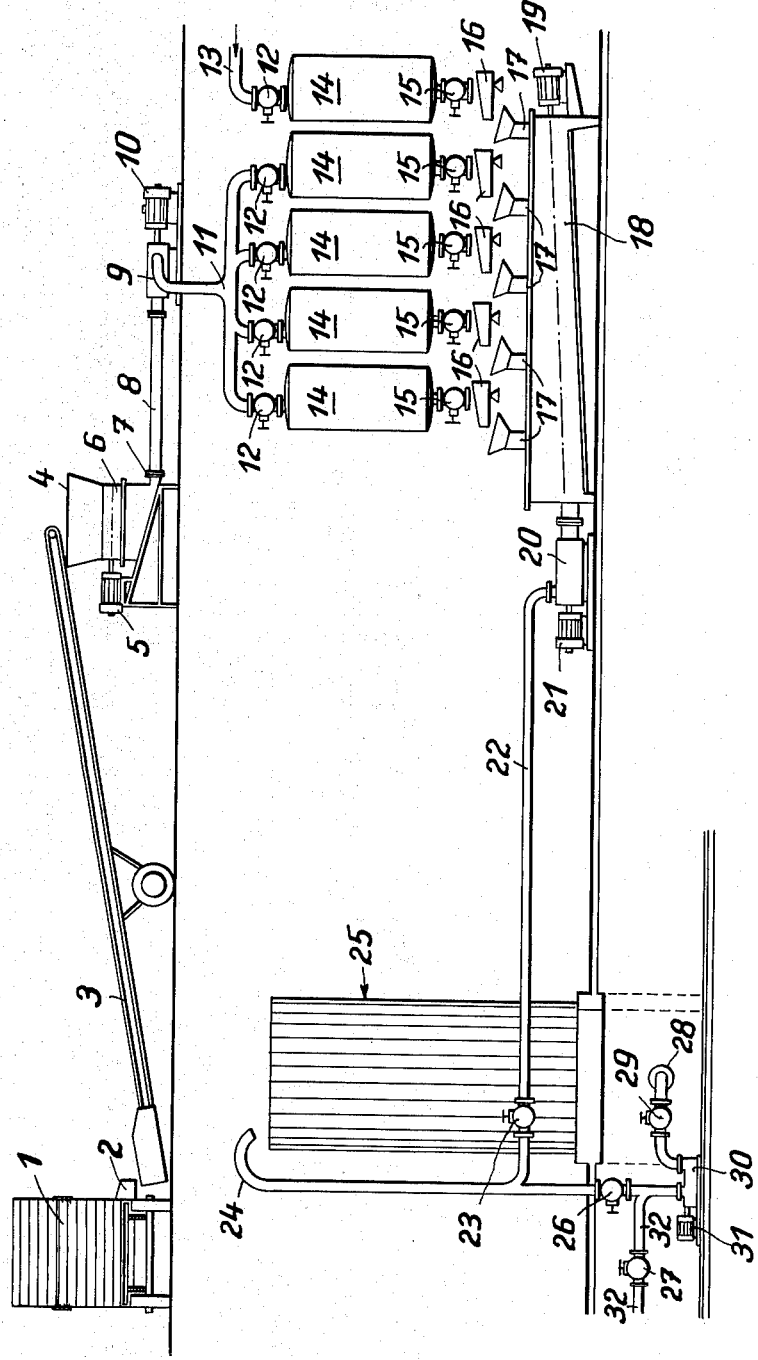

In the device which is schematically shown in FIG. 1, the vehicle 1 automatically discharges through the discharge opening 2. The fodder drops onto the endless conveyor belt of the lift conveyor 3. It then moves on through the funnel 4 into the hammer mill 6 which is driven by a motor 5. The comminuted pulpy fresh fodder then arrives in a supply line 8 from a discharge opening 7 situated at the bottom of the mill. Supply line 8 supplies a pump 9 driven by motor 10 which feeds a pipe branch system 11. Each branch of said pipe system 11 terminates in a storage container 14 for the fresh fodder which may be shut-off by means of a valve 12.

In the embodiment illustrated, four containers for fresh fodder are provided, to hold for instance grass, potatoes, beet leaves, and beets and, in addition, another container for dry substances and chemicals. Supply of the dry substances is effected through a supply line 13 likewise capable of being shut-off. When supplying fresh fodder at a later time, all the containers are closed on top with the exception of the one fresh fodder storage container being supplied so that a given fresh fodder may always enter only one particular storage container 14. The individual storage containers 14 are provided with discharge openings 15 from which a controllable flow of pulpy fresh fodder may be admitted to the weighing device 16. In this manner, any predetermined composition of amounts as are necessary for the individual kinds of fresh fodder may be weighed and passed into the mixing device 18. The mixing device comprises an electric drive motor 19 and is provided with funnel-shaped entry openings 17 for the individual components of the mixture. The filling funnels 17 are arranged directly below the respective weighing devices 16. From the mixing device 18, the pulp of the mixture, which may be viscous owing to the addition of dry substances, is pumped into a line 22. The pump 20 is driven by an electric motor 21. The supply line 22 is provided with a single branch behind the valve 23. The one part of the branch is terminating in a free pipe end 24 which is arranged above the opening of the silo 25. The other part of the branch again terminates via a shut-off valve 26 in the discharge opening of the pump 30. The inlet opening of said pump 30 is connected with the bottom discharge opening 28 of the silo 25 through a valve 29 capable of being shut-off. This pump, too, is provided with a driving motor 31. Between the pump 30 and the shut-off valve 26, there is provided another branch pipe which leads into the fodder supply line 32 and thus to the shed. Also the line 32 may be shut-off by means of a valve 27. The line system behind the pump 30 thus makes it possible either to supply the newly mixed fodder from the mixing machine 18 to the silo 25 or re-pump the fodder which has already been stored in the silo 25 between the discharge opening 28 and the free pipe end 24 or pump the completely fermented fodder into the line system 32 of the sheds.

Figure 2:
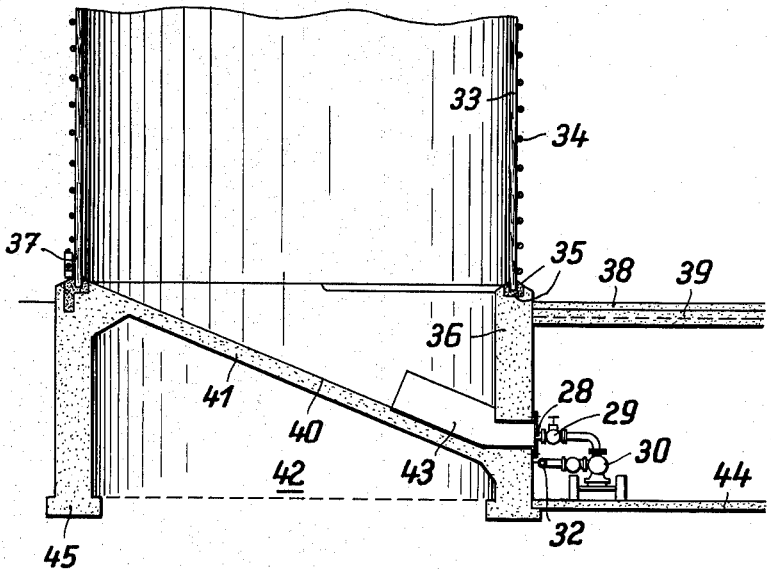
FIG. 2 shows a sectional side view taken of the silo.
Figure 3:
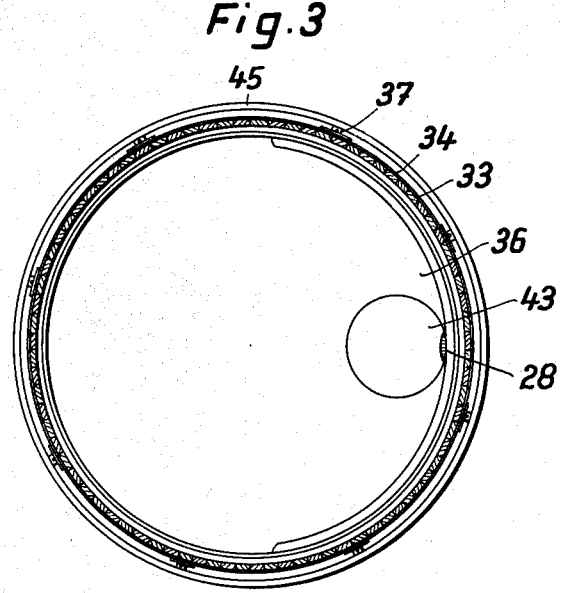
FIG. 3 shows the floor plan of the silo.

Details of the silo 25 may be observed from FIGS. 2 and 3. In FIG. 2, those parts which are connected with the discharge opening 28 are of special interest. The fodder situated in the silo slides down the inclination of a concrete chute 41 by gravity and into a steel hopper provided with a flange 43, said chute 41 being covered with a caoutchouc layer 40. The fodder is pumped through the opening 28 into the suction pipe 29 with the aid of a pump 30 and from there arrives in the pressurized line 32. The pump is fixed on a concrete base 44 below a concrete cover 39 which is provided on its upper side with a wear layer 38. To relieve the concrete chute, the space below the silo 25 is filled with soil. The wooden wall 33 of the silo 25 is kept together by means of ring armatures 34. It rests on a hard asphalt sealing 35 on the reinforced concrete base 36 and is held by a vertical anchoring 37. The whole silo 25 rests on a concrete enlargement 45 at the lower end of the vertically extending concrete cylinder 36.

The ground plan shows the discharge opening 28 at the edge of the circular steel hopper flange 43. The succession of the layers of the base are shown from outside to inside in the order of the base ring 45, the vertical reinforced concrete cylinder, the ring armatures 34 and the wooden wall 33. This figure shows also the vertical anchoring 37.

In carrying out the process and employing the device as described in the figures, applicant has successfully made use of a special pump, the rotor of which consists of a single-thread worm made of special steel and the stator of which has the shape of a double-thread worm and is made of elastic material. This pump is known and is not covered by the subject matter of the invention.

What I claim is:

An installation for preparing a fermented fodder mixture from juicy fresh fodder and a dry mixture containing starch and protein comprising, in combination, a power driven comminuting device for comminuting juicy fresh fodder into a fluid pulp, an outlet defined on said comminuting device, a first pump having an inlet and an outlet, a conduit connecting said comminuting device outlet to said pump inlet, a plurality of first storage containers, each of said containers including a valved inlet and a valved outlet, conduit means connecting said pump outlet to said containers valved inlets whereby said containers may selectively receive comminuted fodder from said pump, a second storage container having a valved outlet, dry mixture fodder supplying means communicating with said second container for supplying a starch and protein containing dry mixture thereto, weighing means associated with the valved outlet of each of said containers, a mixing machine disposed adjacent said weighing means adapted to receive fodder therefrom, said mixing machine including an outlet, a silo container, a second pump having an inlet and an outlet, a conduit connecting said mixing machine outlet to said second pump inlet, and a conduit connecting said second pump outlet to said silo container whereby the fodder mixture mixed in said mixing machine may be conveyed to said silo container.

References Cited by the Examiner

UNITED STATES PATENTS

| | | | |
|---|---|---|---|
| 526,689 | 10/1894 | Davis | 99—2 |
| 1,150,119 | 8/1915 | Hosking | 99—8 |
| 1,212,911 | 1/1917 | Craine | 20—1.4 |
| 1,220,106 | 3/1917 | Hartenberger | 20—1.4 |
| 1,375,961 | 4/1921 | Hart | 20—1.4 |
| 2,353,029 | 7/1944 | Graham | 99—8 |
| 2,445,056 | 7/1948 | Cordis | 20—1.4 |

FOREIGN PATENTS

| | | |
|---|---|---|
| 75,555 | 3/1953 | Denmark. |
| 872,616 | 2/1942 | France. |

WALTER A. SCHEEL, *Primary Examiner.*

BEATRICE H. STRIZAK, ROBERT E. PULFREY,
*Examiners.*